United States Patent
McCormick et al.

(10) Patent No.: US 7,810,347 B2
(45) Date of Patent: Oct. 12, 2010

(54) CONVEYOR BELT HAVING ROTATING DRIVE SHAFT

(75) Inventors: Stephen A. McCormick, Warrington, PA (US); Scott Boyles, Telford, PA (US); Ulf Jagaeus, Viken (SE); Derrick Norvill, Licolnshire (GB)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 12/685,948

(22) Filed: Jan. 12, 2010

(65) Prior Publication Data

US 2010/0166929 A1 Jul. 1, 2010

Related U.S. Application Data

(62) Division of application No. 12/345,968, filed on Dec. 30, 2008.

(51) Int. Cl.
*F25D 25/04* (2006.01)

(52) U.S. Cl. .......................... 62/380; 62/381; 198/630; 198/631.1; 198/617

(58) Field of Classification Search ............ 198/630, 198/631.1, 750.8, 750.14, 952, 617; 62/380, 62/381
See application file for complete search history.

(56) References Cited

U.S. PATENT DOCUMENTS

| | | | | | |
|---|---|---|---|---|---|
| 1,958,322 | A | * | 5/1934 | Symington | 209/310 |
| 2,223,972 | A | | 12/1940 | Sterling | |
| 2,840,090 | A | * | 6/1958 | Bradford | 134/151 |
| 3,099,348 | A | * | 7/1963 | Algatt et al. | 198/750.8 |
| 3,166,383 | A | | 1/1965 | Morris | |
| 3,297,125 | A | * | 1/1967 | Pool et al. | 198/630 |
| 3,343,655 | A | * | 9/1967 | Howard | 198/630 |
| 3,611,737 | A | | 10/1971 | Alaburda et al. | |
| 3,611,745 | A | | 10/1971 | Schlemmer | |
| 3,837,470 | A | * | 9/1974 | Dunkin | 198/750.8 |
| 3,889,488 | A | | 6/1975 | Maeda et al. | |
| 4,171,625 | A | | 10/1979 | Morgan et al. | |
| 4,174,030 | A | * | 11/1979 | Philibert | 198/494 |
| 4,312,156 | A | * | 1/1982 | McWhorter | 451/81 |
| 4,576,562 | A | * | 3/1986 | Anderson | 425/126.2 |
| 4,620,826 | A | * | 11/1986 | Rubio et al. | 414/793.1 |
| 4,763,776 | A | * | 8/1988 | Okumura et al. | 198/630 |
| 4,856,285 | A | | 8/1989 | Acharya et al. | |

(Continued)

FOREIGN PATENT DOCUMENTS

EP 1 426 715 A1 6/2004

(Continued)

OTHER PUBLICATIONS

*w/International Search Report, Mar. 11, 2010.

*Primary Examiner*—Joe Dillon, Jr.
(74) *Attorney, Agent, or Firm*—Joshua L. Cohen (57) ABSTRACT

An apparatus and method for processing products by chilling or freezing includes a conveyor for conveying the products along a plane of travel; lifting means disposed for intermittent contact with the conveyor during processing; cam means rotatable for contacting and displacing the lifting means to contact and displace the conveyor from the plane of travel, thereby displacing the products on the conveyor to prevent the products from adhering to the conveyor and other of the products; and drive means operatively associated with the cam means to impart rotational movement to the cam means for intermittently contacting and displacing the lifting means.

6 Claims, 7 Drawing Sheets

U.S. PATENT DOCUMENTS

| | | | | |
|---|---|---|---|---|
| 5,025,633 | A | | 6/1991 | Furmanek |
| 5,029,835 | A | * | 7/1991 | Blaser et al. .................. 271/98 |
| 5,186,008 | A | | 2/1993 | Appolonia et al. |
| 5,203,445 | A | * | 4/1993 | Shiraiwa .................. 198/464.3 |
| 5,218,826 | A | | 6/1993 | Kirschner et al. |
| 5,267,449 | A | | 12/1993 | Kiczek et al. |
| 5,299,426 | A | | 4/1994 | Lermuzeaux |
| 5,520,013 | A | * | 5/1996 | Kuo ............................ 62/380 |
| 5,547,004 | A | * | 8/1996 | Fransen ................... 198/419.3 |
| 5,836,166 | A | * | 11/1998 | Wardle .......................... 62/63 |
| 5,966,962 | A | * | 10/1999 | Murray et al. ................ 62/374 |
| 6,176,102 | B1 | | 1/2001 | Novak et al. |
| 6,595,350 | B1 | * | 7/2003 | Stouffer ...................... 198/630 |
| 6,634,488 | B2 | * | 10/2003 | Tamlin .................... 198/750.8 |
| 6,981,582 | B2 | * | 1/2006 | Miller et al. ................ 198/456 |
| 7,258,226 | B2 | | 8/2007 | Nelson et al. |
| 7,296,431 | B2 | | 11/2007 | Muscato et al. |
| 7,296,673 | B2 | * | 11/2007 | Blonigan et al. ......... 198/369.6 |
| 7,322,206 | B2 | * | 1/2008 | Berghoff ..................... 62/378 |

FOREIGN PATENT DOCUMENTS

| | | |
|---|---|---|
| GB | 518660 | 3/1940 |

* cited by examiner

CONVEYOR BELT HAVING ROTATING DRIVE SHAFT

The present apparatus and method relate generally to the cooling and freezing of food products.

A type of freezing for a product is individual quick-frozen ("IQF"). IQF freezing of products provides products that are frozen, but not stuck together. There are several known ways that IQF product is produced. One process is to simply freeze the products without allowing the same to contact each other. This may be done by spacing individual product on a freezer belt or rack so they are not in contact with each other. In most cases, this is not done for smaller products because it requires staff to arrange the product fed into the freezer and is an inefficient use of manpower and space, thus reducing capacity. Accordingly, as the pieces to become frozen become smaller, it becomes increasingly more time consuming and difficult to do.

With so-called tunnel freezers, the foods are conveyed continuously on a conveyor belt through a tunnel-like refrigeration space. Typically, a liquid/gas spray nozzle is situated in the tunnel-like refrigeration space. The liquid/gas sprayed into the tunnel-like refrigeration space is distributed uniformly by fans. Additionally or alternatively, solid refrigerant may be impinged onto the product. The foods conveyed through the tunnel-like refrigeration space are then cooled or frozen uniformly on the conveyor.

Other methods of producing IQF products include fluidized beds, nitrogen immersion or multi-pass tunnels. All of these allow for product to be randomly placed on a belt for freezing. Movement is created between adjacent pieces of product to prevent sticking, thereby creating IQF, to keep pieces of product moving in relation to one another. For example, in nitrogen immersion, the pieces are not permitted to contact each other when dropped into a nitrogen bath and are thereby frozen at the surface of the bath before they can contact and adhere to one another. Multi-pass tunnels (including flighted tunnels) drop the pieces from one belt to another repeatedly to break the product apart before it is frozen solid. However, none of these methods is suitable for processing product contained in trays, since known methods would scatter the trays and displace the product from the trays.

In addition, different types of conveying equipment may be employed which are suitable for freezing processes. In many cases, companies make both IQF and tray types of products and attempt to have both processed with the same equipment. Attempts to achieve this are done by removing or bypassing the IQF portion of the freezing line when tray product freezing is desired. This typically requires relocation of equipment, and results in a reduction in production capacity due to the removal of part of the process line.

It is therefore desired to have the conveyor constructed and arranged to move uninterrupted along the conveyed path of travel and not be removed from the process line.

Apparatus and method embodiments are provided for chilling or freezing products. It is understood that the following detailed description of the embodiments is exemplary, and is not intended to be limiting.

BRIEF DESCRIPTION OF THE DRAWINGS

The accompanying drawings are included to provide a further understanding of the apparatus and method embodiments and are incorporated in and constitute a part of this specification. The drawings illustrate various embodiments and serve to explain the apparatus and method, but are not intended as limitations.

DETAILED DESCRIPTION

Apparatus and method embodiments are provided for conveying food products on a conveyer (i.e. belt) for processing through for example a refrigeration zone, such as a tunnel freezer. More specifically, the apparatus and method relates to a device wherein a wave-like motion is provided to the conveyor to selectively displace the conveyor, and hence the food products, along at least part of the conveyed path of travel to prevent the food products from adhering to the conveyor or to each other during freezing.

The apparatus and method for freezing products through a refrigeration zone, such as a tunnel freezer, includes conveying the product in such a way so as not to disturb the product or products contained in a tray. Further, the apparatus and method selectively agitate product which is disposed upon the conveyor to be individually quick frozen (IQF). The apparatus is suitable for use in chilling and freezing food products such as for example, meat, chicken and seafood products. As used herein, cooling refers to a temperature reduction of a product to either chilling or freezing, depending on the total heat extraction from the product.

The apparatus provides a system for chilling or freezing products, and includes a conveyor, such as a conveyor belt, that transports the products through refrigeration, such as mechanical refrigeration or a refrigerated medium for chilling or freezing the products, but with the additional feature of actuating or agitating the conveyor, making selective, intermittent contact with the conveyor and displacing the conveyor from its plane of travel, thereby displacing the products on the conveyor during freezing to prevent products from adhering to the conveyor or to other products being conveyed. Agitation of the conveyor and injection of any refrigeration medium can take place in the same or different zones.

The apparatus includes a multiple cam wave axle for displacing a lifting bar; a bearing surface mounted on the lifting bar; which is engaged by the cam on the wave axle; and a conveyor, such as a conveyor belt, that transports the products through a cooling or freezing apparatus, such as a tunnel freezer.

The apparatus can freeze and convey different types of food products, and in various product forms; so as not to adversely affect the integrity of the product while being conveyed through the system. The food products may be IQF or non-IQF, and by way of example, raw or cooked, may require specific shape and orientation, may be breaded or unbreaded, marinated or unmarinated, or food products comprising any type of coating.

The apparatus is flexible in that it can switch between IQF and non-IQF products, including but not limited to, products that can tolerate layering in the freezer, wherein they are conveyed and quick frozen by the apparatus.

The apparatus and method may employ the total conveyor area for utilization of the capacity, without allowing food product to be removed from sections of the conveyor between the inlet and outlet of the freezer housing and the freezing zone, regardless of the product/process type. The freezing zone may comprise a single freezing zone or multiple freezing zones wherein the temperature of the product is reduced to about or below the freezing point of the product. The apparatus may include one or a plurality of chilling or freezing zones.

In one embodiment of the apparatus, a wave-like motion is provided to the conveyor by utilizing a multiple cam wave axle for displacing a lifting bar, to contact and displace the conveyor. A bearing surface on the lifting bar is engaged by the cam on the wave axle to displace the lifting bar.

Figure 8:
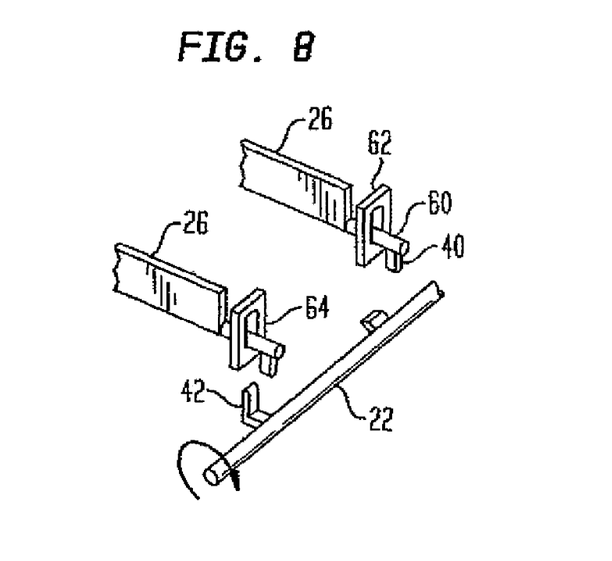
FIG. 8 shows a schematic of the multiple cam wave axle with lifting bar of the apparatus of FIG. 1.

In another embodiment of the apparatus, the wave-like motion is provided to the conveyor by utilizing a multiple cam wave axle for sequentially displacing consecutive lifting bars, to contact and displace the conveyor upward in a forward or backward moving wave action on the conveyor belt. The bearing surface may include a lifting bar finger and the multiple cams on the wave axle comprise cam lifting lobes (as shown in FIG. 8). The lifting bars are engaged by cams that are disposed in a staggered or intermittent pattern about the radius of the axle and along its length.

The wave-like motion may be set such that the motion in the adjacent conveyor sections can be in phase, whereby a wave like motion is set up through the conveying system. Additionally, the frequency and the amplitude of the wave may be varied by adjusting the speed and the degree of interaction between the conveying mechanism (e.g., belt) and the multiple cam wave axle that controls the actions of the lifting bars. Alternatively, the frequency is variable, but the amplitude is fixed.

The wave-like, sinuous or undulating motion (for the sake of brevity hereinafter "wave-like motion") provided through the conveying system can maximize the product surface area exposed to the refrigeration medium, in which the refrigeration medium works either intermittently, simultaneously or continuously. In certain embodiments of the system, the wave-like motion is present either in part of or along the entire length of the conveying section and the refrigeration equipment housing. In other embodiments, the wave-like motion is present so as to provide the conveying mechanism with alternating sections of non-wave sections followed by wave sections, or wave sections followed by non-wave sections, or in any desired arrangement.

The wave-like motion increases the heat transfer rates by maximizing the product surface area exposed to the refrigeration medium that is normally not achieved when the product is touching other products or parts of the conveying mechanism. This results in more uniform heat transfer, leading to shorter freezing times, improved yields, higher product quality, and better cryogenic efficiency. A 50% to 100% increase in heat transfer rates and 25% to 50% decrease in dwell times may be achieved compared to existing freezing equipment.

Figure 1:
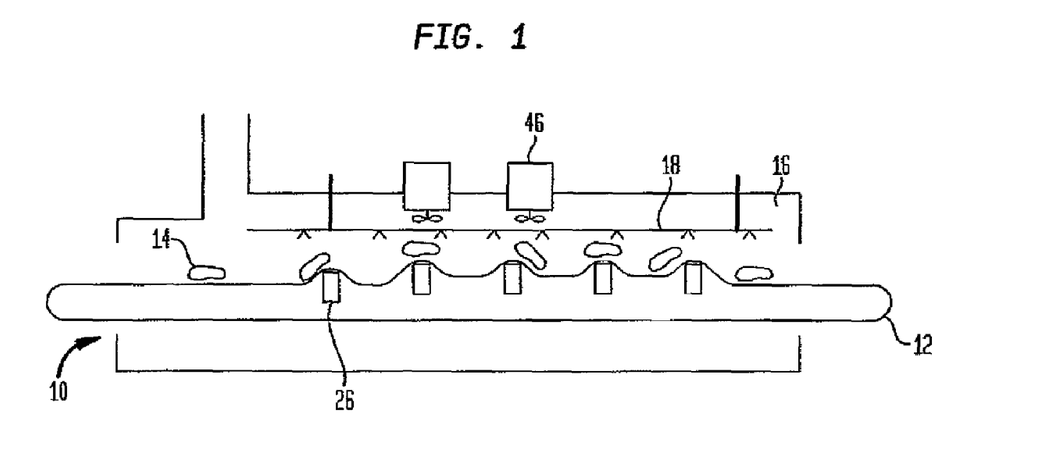
FIG. 1 shows an apparatus for chilling and freezing different types of individual quick-frozen food products.

Referring to FIG. 1, an apparatus embodiment of the invention is shown generally at 10, and may be incorporated in a tunnel freezer. The apparatus 10 includes a conveyor belt 12 to move product 14 through the freezer housing 16. The conveyor belt 12 may be continuous as it passes through the length of the freezer housing 16. The housing 16, is cooled by mechanical refrigeration, carbon dioxide or nitrogen, or some other means using a refrigeration medium, including a combination of cryogenic and mechanical refrigeration techniques. In FIG. 1, a carbon dioxide or nitrogen spray outlet 18 provides the refrigeration medium.

Figure 2:
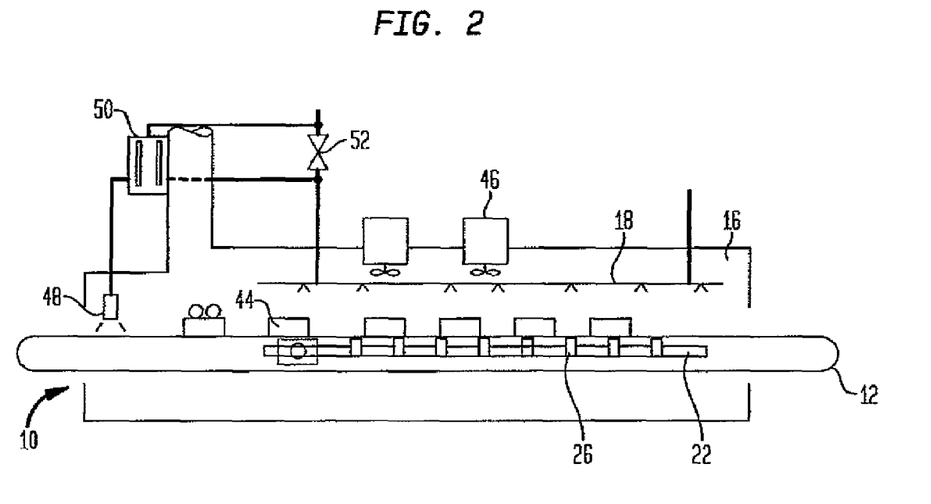
FIG. 2 shows an apparatus for chilling and freezing different types of individual frozen food products contained in trays.

As shown in FIG. 2, the apparatus 10 may also be constructed and arranged such that a wave axle 22 and lifting bars 26 are positioned away from the conveyor belt 12 to permit the conveyor to move uninterrupted along the plane of travel. This arrangement may be used when the food product is placed in trays 44 as illustrated in FIG. 2.

Figure 3:
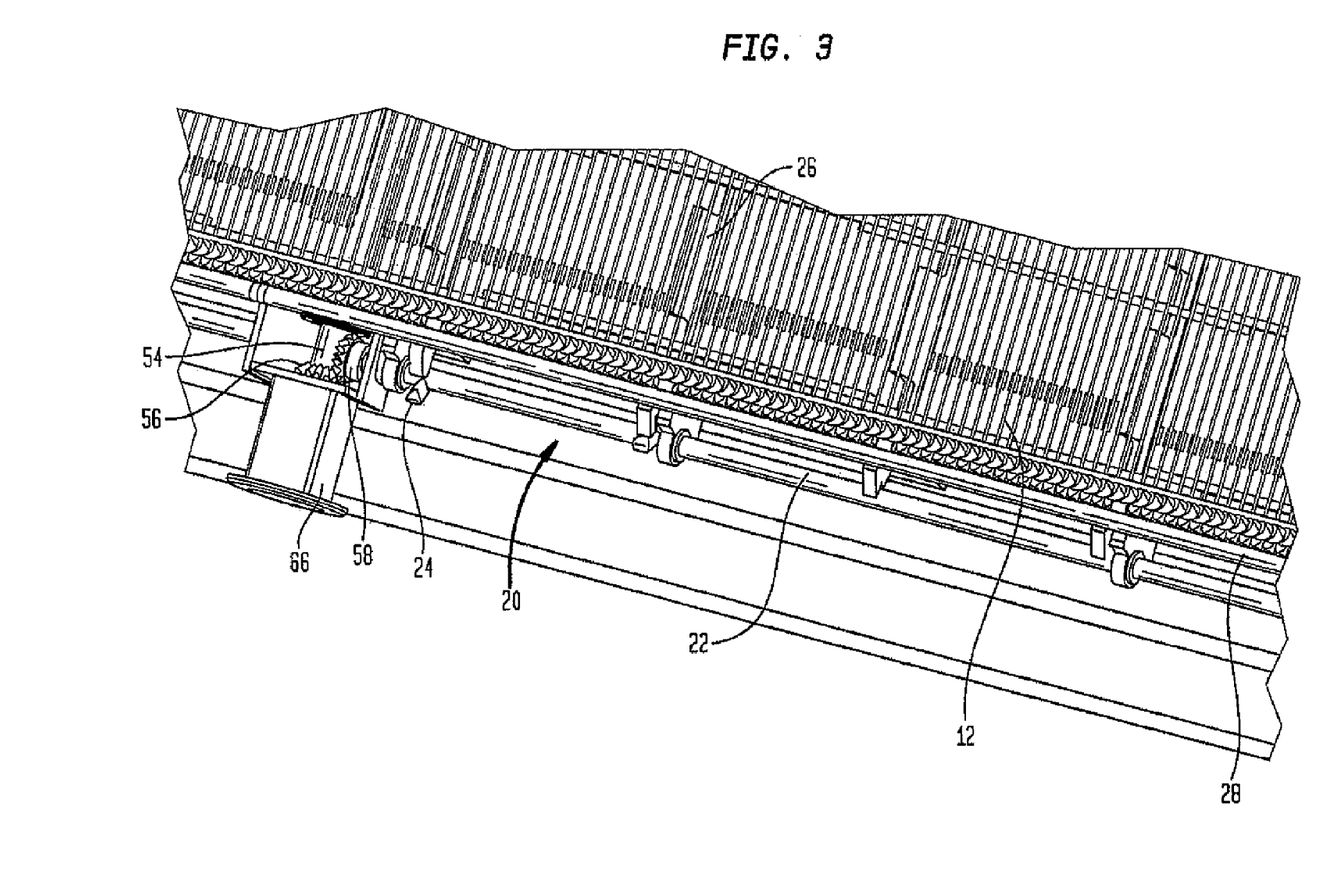
FIG. 3 shows a portion of the conveyor and multiple cam wave axle with lifting bar of the apparatus of FIG. 1.

Referring to FIG. 3, a wave generating assembly 20 is provided to displace the product conveyed on the conveyor belt 12 to permit an IQF freeze. The conveyor belt 12 may be constituted of stainless steel and may move on slideways of synthetic material secured to the frame 28. Belt 12 is secured in guides that permit differential expansion between the steel and the synthetic material without hindrance and without deformation of the slides. The drive motor (not shown) of conveyor belt 12 may be mounted on the frame 28 and may drive the conveyor belt by means of sprockets or other known drive devices, the tension of the belt and its differential elongation being compensated by known auxiliary devices.

The wave generating assembly 20 includes the wave axle 22 with multiple cams 24 for displacing a lifting bar 26. The wave axle 22 may be supported on the frame 28 adjacent to the conveyor belt 12 extending in a direction parallel to the center of conveyor belt 12 on both the left and right hand sides of the conveyor. The wave axle 22 may be driven by a motor 66 via gears 56, 58 attached to a drive shaft 54 powered by the motor, and to the wave axle 22, respectively.

Figure 9:
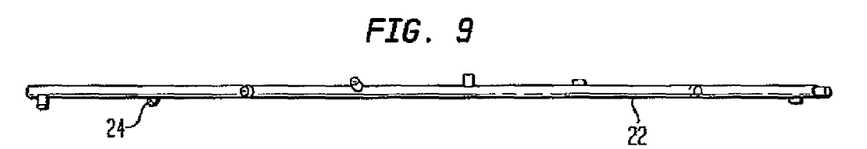
FIG. 9 shows the left hand multiple cam wave axle.
Figure 10:
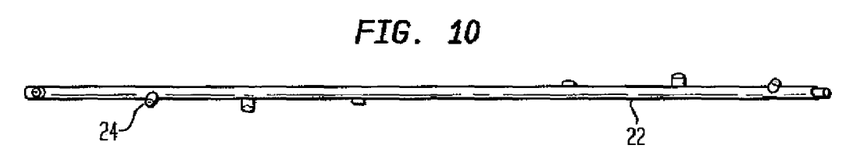
FIG. 10 shows the right hand multiple cam wave axle.
Figure 13:
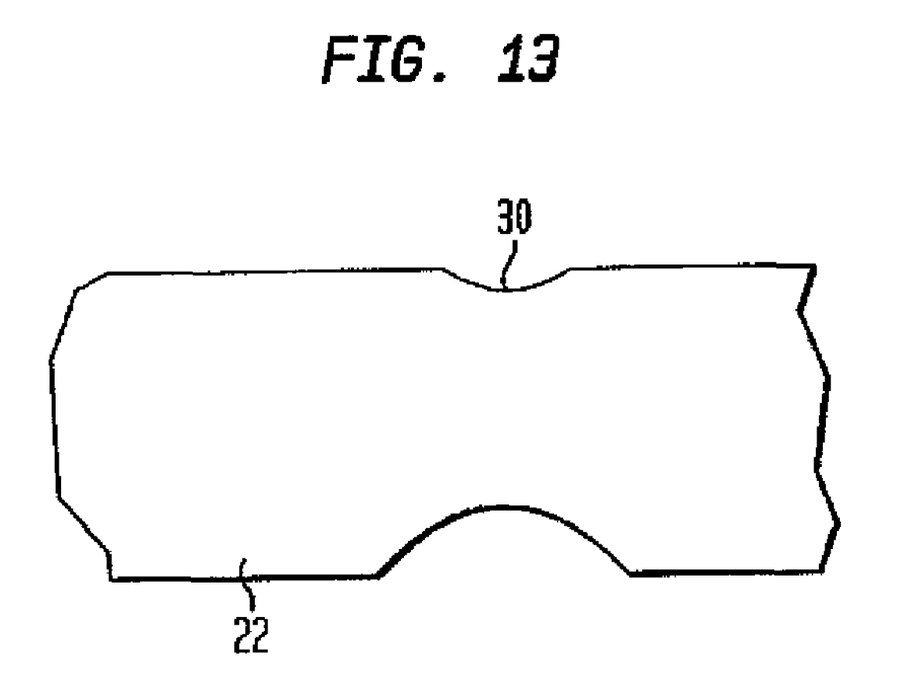
FIG. 13 shows a partial view of a stepped region generally located on the wave axle for mounting the cam.

Other wave axles 22, as shown in FIGS. 9 and 10, may be mounted on the left side (FIG. 9) of the conveyor belt 12 and on the right side (FIG. 10) of the conveyor belt 12 along its length. The wave axles are substantially similar in design, but those on opposite sides of the conveyor belt comprise opposite hands. The wave axles may have generally stepped regions 30 (FIG. 13) equally located along its length. In an illustrative arrangement, eight (8) cams 24 are mounted on each of the left side and right side wave axles 22.

Figure 11:
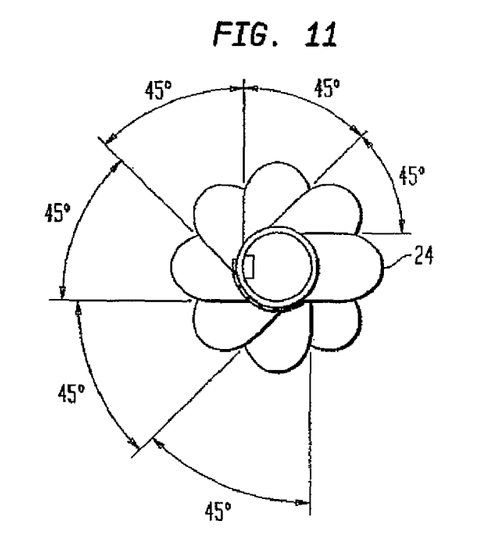
FIG. 11 shows the left hand cam.
Figure 12:
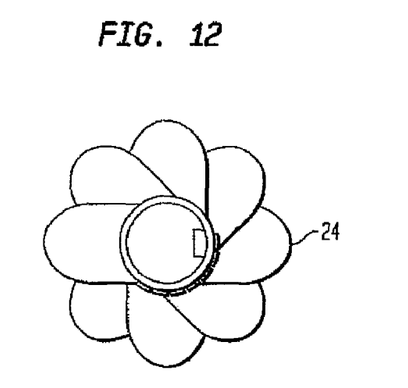
FIG. 12 shows the right hand cam.

Cams 24 are generally located in the stepped regions 30 on the wave axle 22 and are arranged in a staggered formation along the axle 22. Separate cams 24 are mounted on the wave axle located on the left side (FIG. 11) of the conveyor belt 12 and on the right side (FIG. 12) of the conveyor belt 12. The earns 24 are similar in design but opposite hands (FIGS. 11 and 12). In an exempletive arrangement, eight (8) cams 24 are mounted on each of the left side and right side wave axles 22 and may be secured to the wave axle by fasteners such as set screws, for example, M6×30.

Both the cams 24 and the wave axles 22 may be made from a stainless austenitic chromium-nickel steel material, for example, SAE 304, due to its good corrosion resistance and weldability.

Figure 4:
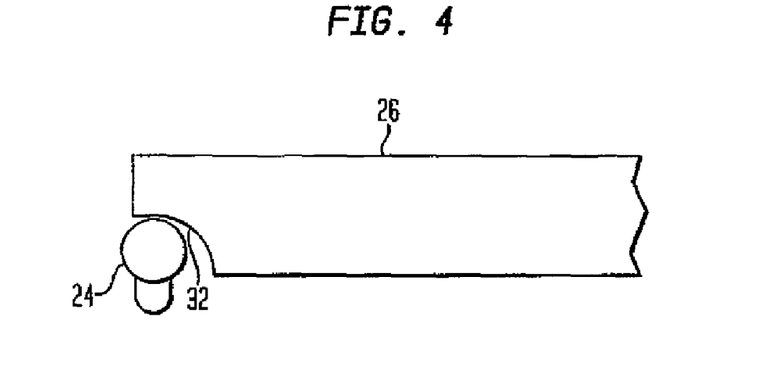
FIG. 4 shows a schematic of the wave axle cam disengaged from the lifting bar of the apparatus in FIG. 1.
Figure 5:
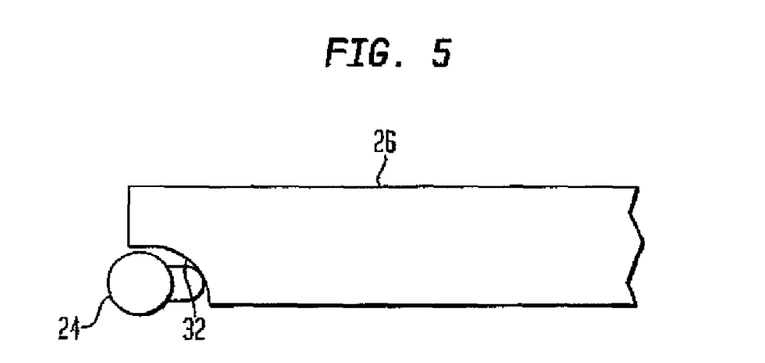
FIG. 5 shows a schematic of the wave axle cam approaching for releasable engagement with the bearing surface of the lifting bar and the lifting bar in a partially raised position of the apparatus in FIG. 1.
Figure 6:
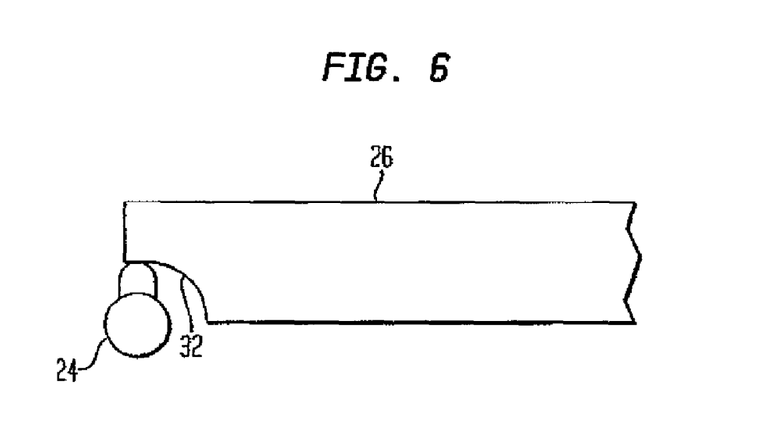
FIG. 6 shows a schematic of the wave axle cam engaged to the bearing surface of the lifting bar and the lifting bar in a fully raised position of the apparatus in FIG. 1.

Referring now to FIGS. 4-6, a bearing surface 32 formed on the lifting bar 26 is engageable with the cam 24. These figures show the lifting bar 26 displaced by the cam 24 in a series of positions in relation to the lifting bar's starting point and maximum lift point.

FIG. 4 illustrates the condition where the lifting bar 26 and the cam 24 are in a lowered or non-engaged position.

FIG. 5 illustrates the cam 24 rotated 90 degrees toward the bearing surface 32 to engage same to elevate the lifting bar 26 and begin to accelerate and elevate the belt (not shown) to its maximum position.

FIG. 6 illustrates the cam 24 rotated 180 degrees from its initial position and in full engagement with the lifting bar 26 resulting in the belt (not shown) moved to its uppermost position. This rapid movement of the belt will cause the pieces of food product to be displaced from or projected off of (above) the belt for a short duration.

Figure 7:
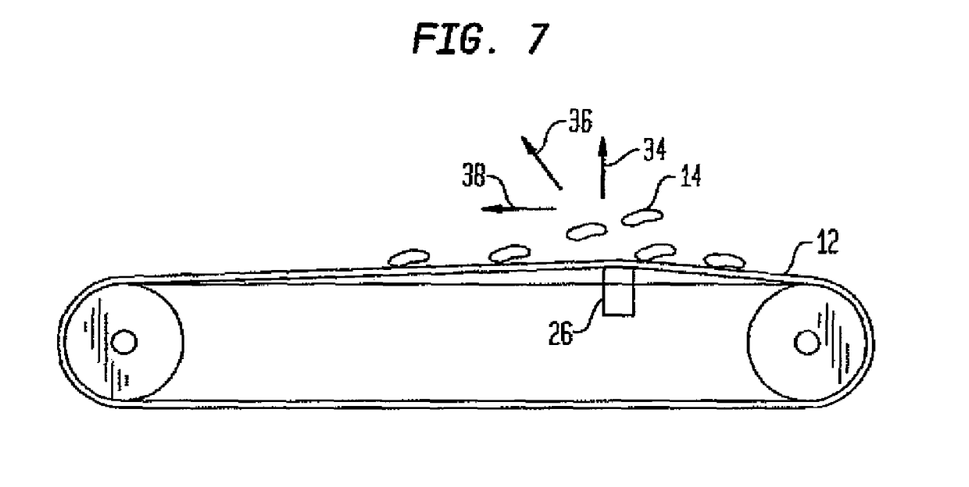
FIG. 7 shows a schematic elevational view illustrating product being conveyed along and displaced from the conveyor of FIG. 1.

As shown in FIG. 7, the belt 12 will conform substantially to the contour of the lifting bar 26. The center portion of the lifting bar 26 will have the greatest movement and thus will project the product or products 14 in this vicinity the highest off of the belt 12. As seen in FIG. 7, the pieces of the product 14 may have a trajectory that is in part a combination of the "Y" component indicated by arrow 34 and a "Z" component indicated by arrow 36. The food product 14 may be projected not only upwardly from the belt ("Y" component) and along the travel direction of the belt 12 ("Z" component) but may be laterally displaced, i.e., it may have an "X" component as indicated by arrow 38 in FIG. 7. The trajectory of the pieces 14 will displace the products from each other on the conveyor during chilling or freezing and prevent the products from adhering to the conveyor or other of the products during chilling or freezing.

In an alternative embodiment of the apparatus 10, as shown in FIG. 8, the bearing surface includes a lifting bar finger 40 extending from the lifting bar 26, and the multiple cams on the wave axle 22 include cam lifting lobes 42. In one embodiment, the lifting bar finger 40 is attachably disposed below an extension 60 of the lifting bar 26. The lifting bar extension 60 extends through a slot 64 of displacement control member 62, which in part defines the range of movement of the extension 60 and the lifting bar 26 in the Y-component direction. The extension 60 and lifting bar 26 are at their lowest point when the lifting bar finger 40 is disengaged from the cam lifting lobe 42. At this point, the lifting bar 26 may be disengaged from contact with the conveyor 12. When the lifting bar finger 40 engages the cam lifting lobe 42, the lifting bar finger 40 is displaced upward, causing the lifting bar 26 to engage and move the conveyor belt 12 upwards, until maximum displacement of the belt 12 is reached due to the extension 60 being elevated to its highest point within the slot 64 of the control member 62, and with the cam lifting lobe 42 in full engagement with the lifting bar finger 40. When consecutive cam lifting lobes 42 along the multiple cam wave axle 22 engage their corresponding lifting bar fingers 40 as the wave axle is rotated, the lifting bars 26 are lifted in sequence to contact and displace the conveyor 12 and to impart the wave-like motion to the conveyor belt 12.

In one embodiment, when products for which displacement is not desired are processed in the freezer (e.g., for products in trays 44, FIG. 2), disengaging the lifting bar 26 from the conveyor belt 12 ceases the displacement. When displacement is desired, the lifting bar 26 contacts the conveyor belt 12 when actuated and moved to a position where the bars 26 intermittently contact and displace the conveyor belt 12. Circulation means such as fans 46 may be used to enhance heat transfer in either IQF or tray mode of operation.

In a further embodiment, the conveyor belt 12 is disposed at an angle to the horizontal and may comprise multiple conveyor sections, with transfers of product between the sections. Each section can be actuated or non-actuated as desired by the apparatus 10.

On the conveyor belt 12 may be a retaining means (not shown) for retaining products on the conveyor belt 12. These retaining means are generally known to those skilled in the art, and include, for example, projections raised above the top surface of the conveyor belt 12. Adjacent to the conveyor belt 12 may be means to retain (not shown) the product being displaced on the surface of the conveying mechanism, while the product is traveling through the equipment housing. Such retaining means can include belt side clips (not shown) which may be 3 inches (75 mm) high for example, and are part of the conveyor belt 12.

In certain embodiments, the wave generating means may include self-propelling mechanisms to effectuate movement of the lifting bar 26 without outside power.

Referring again to FIG. 2, the process may include estimating the product heat load so as to control the degree of cryogen injection. One embodiment utilizes a weigh scale or a laser or other optical measuring means that estimates/calculates the volume/weight of the product, or other characteristics of same, so as to control the amount of injection of the refrigeration medium necessary for that product. This embodiment may use a sensor 48 to sense the throughput of the product, the sensor utilizing a controller 50 to actuate the valve 52, which controls the amount of cryogen injection.

The agitation and the injection of any refrigeration medium may take place in the same freezing zone or in different freezing zones. The temperature established in the freezing zone may be isothermal, co-current or counter-current. Convective processes may be used to disperse the refrigeration medium uniformly in the freezing zone for better heat transfer. Such processes can utilize, but are not limited to, fans, impingement or directed gas jets to disperse the refrigeration medium.

The freezer apparatus embodiment 10 and method permit a user to consolidate separate freezer lines (of IQF and trayed products) by being able to switch or alternate between the "vibratory" mode and the non-vibrating or "tunnel" mode.

The present embodiments have a compact design which provides increased space in a tunnel freezer for cryogen application use, by eliminating chain and sprocket drives placed at the cam shaft ends for an agitation system assembly to agitate or vibrate the product conveyed on the conveyor belt to produce an IQF freeze.

The apparatus and method ensure that frozen food products will not adhere to one another, the conveyor or the tray transporting the food products during freezing.

In certain embodiments an apparatus for conveying food products to be processed, includes conveying means for conveying the food products along a path of travel for processing; lifting means operatively associated with the conveying means for displacing the conveying means vertically from the path of travel at select intervals; cam means adapted for rotation to contact and impart a lifting force to the lifting means at the select intervals for providing an undulating motion to the conveying means at the select intervals; and drive means connected to the cam means for transmitting a drive force to the cam means for rotational movement of the cam means. The lifting means may include at least one longitudinal member having a bearing surface, and the cam means may include at least one shaft member having at least one protrusion extending therefrom for intermittent contact with the bearing surface at the select intervals.

In one embodiment, the cam means comprises a first shaft member disposed at a first side of the conveying means and having a first plurality of protrusions extending therefrom in a staggered arrangement along a length of the first shaft member, and a second shaft member disposed at a second side of the conveying means opposite to the first side and having a second plurality of protrusions extending therefrom in a staggered arrangement along a length of the second shaft member, the first and second plurality of protrusions co-acting with the lifting means at the select intervals for displacing the lifting means to impart an undulating motion to the conveying means.

In one embodiment, an apparatus for conveying products to be chilled or frozen without said products adhering to the apparatus or other products includes a conveyor for transporting the products through refrigeration for chilling or freezing the products; a lifting bar disposed below and proximate to the conveyor for selective, intermittent contact with the conveyor to displace the conveyor from a plane of travel, thereby displacing the products on the conveyor to prevent the products from adhering to the conveyor or other of the products; a wave generating assembly adapted for rotation and having a cam arrangement for displacing the lifting bar; a bearing surface on the lifting bar releasably engageable with the cam arrangement to displace the lifting bar to contact and displace the conveyor from the plane of travel; and drive means operatively associated with the wave generating assembly to rotate the cam arrangement for intermittently displacing the lifting bar.

In certain embodiments a method for processing food products includes conveying products for processing on a conveyor, supporting the conveyor along a path of travel, rotating a wave generating means proximate the conveyor; contacting the wave generating means intermittently with the conveyor for displacing the supported conveyor and products along at least a portion of the path of travel to prevent the products from adhering to the conveyor and other of the food products on the conveyor during processing. In one embodiment, a method is provided for processing food products, comprising conveying products for processing on a conveyor, supporting the conveyor along a path of travel, rotating a wave generating means comprising a cam means aligned for transversely oriented rotation relative to the path of travel and positioned at a lateral side relative to said path proximate to a lifting means; contacting the lifting means intermittently with the conveyor means for displacing the supported conveyor and products along at least a portion of the path of travel to prevent the products from adhering to the conveyor and other of the food products on the conveyor during processing.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. A method for processing food products, comprising:
conveying products for processing on a conveyor, supporting the conveyor along a path of travel, rotating a wave generating means comprising a cam means aligned for transversely oriented rotation relative to the path of travel and positioned at a lateral side relative to said path proximate to a lifting means; contacting the lifting means intermittently with the conveyor for displacing the supported conveyor and products along at least a portion of the path of travel to prevent the products from adhering to the conveyor and other of the food products on the conveyor during processing.

2. The method according to claim 1, wherein the displacing the supported conveyor further comprises imparting an undulating motion to the conveyor.

3. The method according to claim 2, further comprising varying amplitude and frequency of the undulating motion.

4. The method according to claim 2, further comprising varying the frequency of the undulating motion.

5. The method according to claim 1, wherein the processing comprises reducing a temperature of the food products.

6. The method according to claim 3, wherein the reducing the temperature of the food products comprises subjecting the food products to a cryogenic substance.

* * * * *